(12) United States Patent
Schneider et al.

(10) Patent No.: US 11,697,100 B2
(45) Date of Patent: Jul. 11, 2023

(54) DEVICE AND METHOD FOR COOLING OR HEATING A FINE-GRAINED SOLID

(71) Applicant: Metso Outotec Finland Oy, Tampere (FI)

(72) Inventors: Günter Schneider, Lorsch (DE); Robert Maduta, Hemsbach (DE); Linus Perander, Sandefjord (NO); Eugen Weissenburger, Frankfurt am Main (DE); Timo Hensler, Frankfurt am Main (DE)

(73) Assignee: METSO OUTOTEC FINLAND OY, Tampere (FI)

( * ) Notice: Subject to any disclaimer, the term of this patent is extended or adjusted under 35 U.S.C. 154(b) by 74 days.

(21) Appl. No.: 17/256,325

(22) PCT Filed: Jul. 1, 2019

(86) PCT No.: PCT/EP2019/067547
§ 371 (c)(1),
(2) Date: Dec. 28, 2020

(87) PCT Pub. No.: WO2020/007777
PCT Pub. Date: Jan. 9, 2020

(65) Prior Publication Data
US 2021/0260551 A1 Aug. 26, 2021

(30) Foreign Application Priority Data

Jul. 2, 2018 (DE) ..................... 10 2018 115 940.4

(51) Int. Cl.
*B01J 8/18* (2006.01)
*B01J 8/00* (2006.01)
(Continued)

(52) U.S. Cl.
CPC ........... *B01J 8/1836* (2013.01); *B01J 8/0055* (2013.01); *B01J 8/26* (2013.01); *F27B 15/003* (2013.01);
(Continued)

(58) Field of Classification Search
CPC . B01J 8/1836; B01J 8/0055; B01J 8/26; B01J 2208/00902; F27B 15/003; F27D 15/02
(Continued)

(56) References Cited

U.S. PATENT DOCUMENTS 2,419,245 A 4/1947 Arveson
2,631,927 A 3/1953 Trainer et al.
(Continued)

FOREIGN PATENT DOCUMENTS

CN 1072614 A 6/1993
CN 203355710 U 12/2013
(Continued)

OTHER PUBLICATIONS

Machine translation of WO-2011/015503 A1 (Year: 2022).*
(Continued)

*Primary Examiner* — Huy Tram Nguyen
(74) *Attorney, Agent, or Firm* — Robert P. Michal, Esq.; Carter, DeLuca & Farrell LLP

(57) ABSTRACT

A device for cooling a fine-grained solid includes a fluidized bed cooler/heater in which the solid is fluidized with a fluidizing gas and thereby releases energy in the form of heat within the cooler/heater at least two cyclones which are connected in parallel. The cyclones are arranged such that after the fluidization of the solid the fluidizing gas passes through the cyclones so contained particles are removed.

9 Claims, 4 Drawing Sheets

Figure 1A:
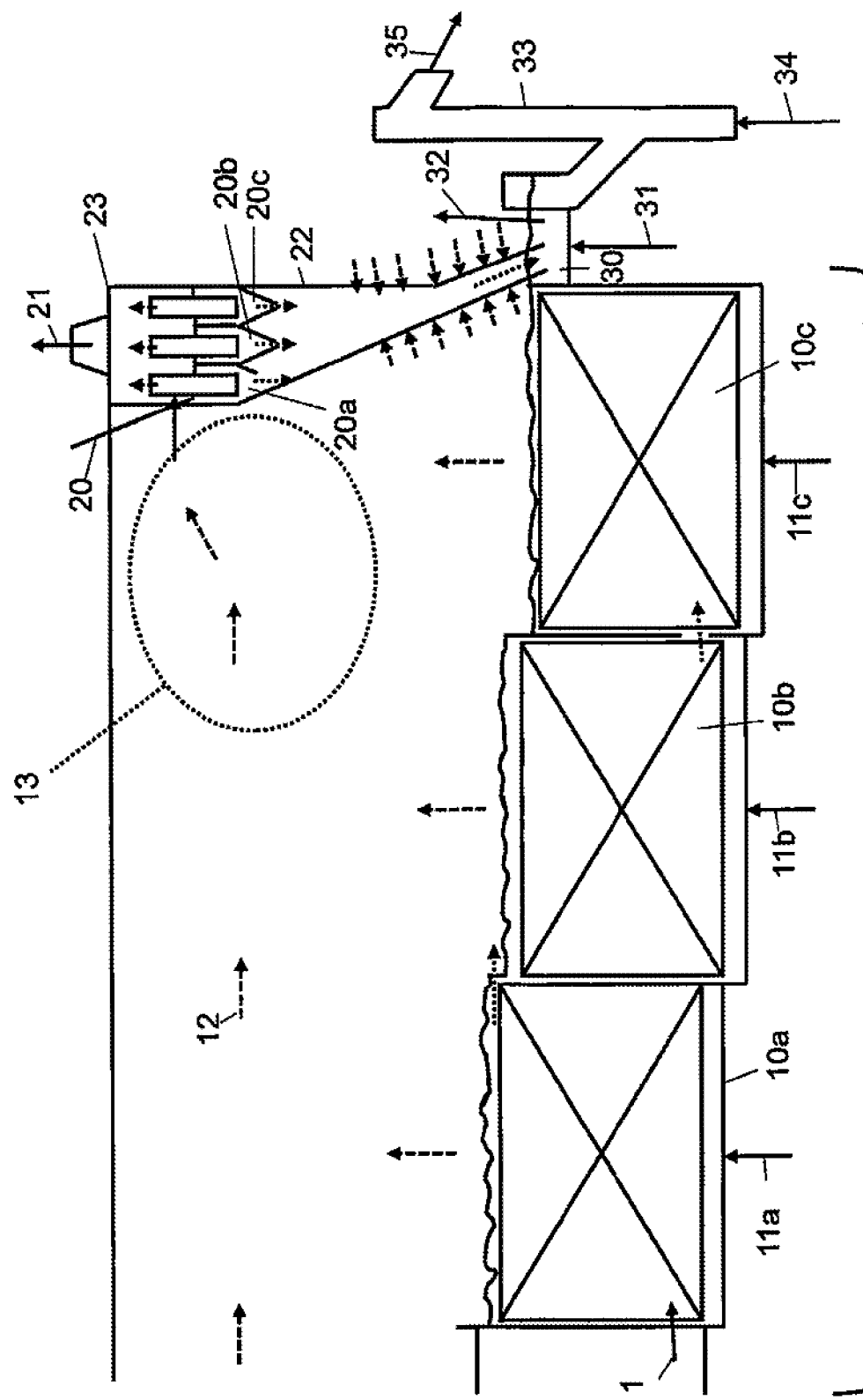

(51) Int. Cl.
  *B01J 8/26* (2006.01)
  *F27B 15/00* (2006.01)
  *F27D 15/02* (2006.01)

(52) U.S. Cl.
  CPC ..... *F27D 15/02* (2013.01); *B01J 2208/00902* (2013.01)

(58) Field of Classification Search
  USPC ........................................................ 422/146
  See application file for complete search history.

(56) References Cited

U.S. PATENT DOCUMENTS

| | | | |
|---|---|---|---|
| 2,634,191 A | 4/1953 | B. G. Jones | |
| 8,920,736 B2 * | 12/2014 | Liu | F23C 10/10 422/232 |
| 2012/0037000 A1 | 2/2012 | Krishnamurthy et al. | |

FOREIGN PATENT DOCUMENTS

| | | |
|---|---|---|
| CN | 104359330 A | 2/2015 |
| DE | 10300838 A1 | 7/2004 |
| DE | 102008008943 A1 | 8/2009 |
| GB | 763469 A | 12/1956 |
| WO | 0158568 A1 | 8/2001 |
| WO | 0176722 A1 | 10/2001 |
| WO | 2011015503 A1 | 2/2011 |

OTHER PUBLICATIONS

Office Action issued by the China National Intellectual Property Administration in relation to Chinese Application No. 201980044938.4 dated Feb. 7, 2022 (7 pages) English language translation (9 pages).
International Preliminary Report on Patentability issued by the International Bureau of WIPO in relation to International Application No. PCT/EP2019/067547 dated Jan. 14, 2021 (8 pages).
International Search Report issued by the European Patent Office acting as the International Searching Authority in relation to International Application No. PCT/EP2019/067547 dated Sep. 30, 2019 (4 pages).
Written Opinion of the International Searching Authority issued by the European Patent Office acting as the International Searching Authority in relation to International Application No. PCT/EP2019/067547 dated Sep. 30, 2019 (6 pages).
German Search Report issued by the German Patent and Trademark Office in relation to German Application No. 10 2018 115 940.4 dated Feb. 13, 2019 (10 pages).
Chemical Engineering Manual, "Separation of Gaseous Heterogeneous System", Chapter 21, pp. 21-121 to 21-122, (4 pages) Oct. 31, 1989, including English translation (4 pages), 8 pages total.
Chinese Rejection Decision dated Mar. 28, 2023, (11 pages) issued in corresponding CN Appln. No. 201980044938.4, including English translation (10 pages), 21 pages total.

* cited by examiner

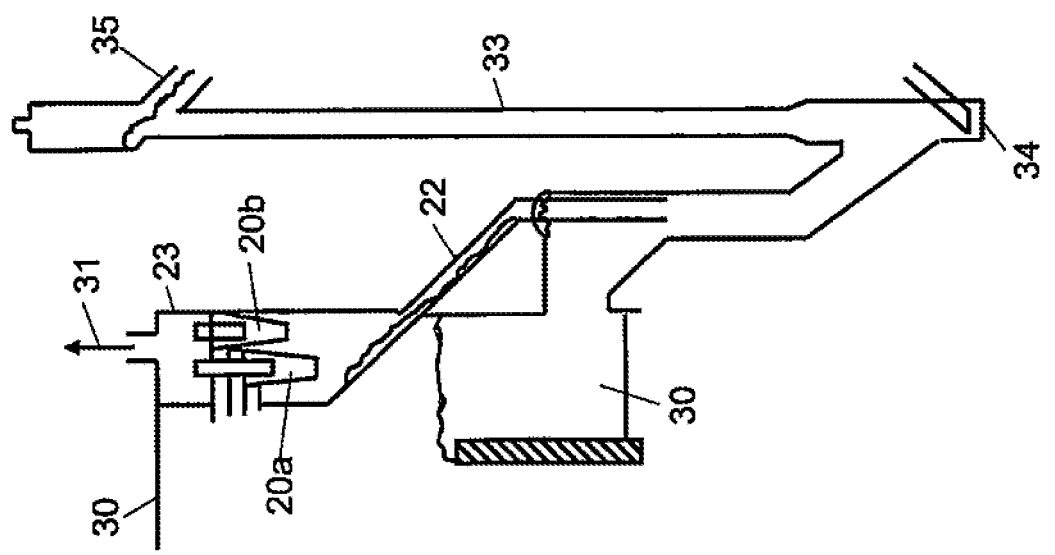

DEVICE AND METHOD FOR COOLING OR HEATING A FINE-GRAINED SOLID

CROSS-REFERENCE TO RELATED APPLICATIONS

This application is a national phase entry under 35 U.S.C. 371 of PCT International Application No. PCT/EP2019/067547 filed Jul. 1, 2019, which claims priority to German Patent Application No. 10 2018 115 940.4, filed Jul. 2, 2018, the disclosure of each of these applications is expressly incorporated herein by reference in their entirety.

The invention belongs to a device and its relating method for cooling or heating a fine-grained solid, comprising a fluidized bed cooling with or without cooling elements in which the solid is fluidized with a fluidizing gas and thereby releases energy in the form of heat.

Fluidized bed coolers are well-known in the state of the art. Thereby, solid particles are fluidized in at least one fluidized bed with a fluidizing gas. Either the fluidizing itself is already sufficient for cooling/heating, or additional elements are installed inside through which a heat transfer medium t is passed.

Normally, no additional separator in the form of a cyclone is integrated into the cooler/heater. However, in the solids cooling/heating stages of a specific process fines/fine dust gets raised and dispersed in the upper geometrical areas of the cooler/heater itself due to fluidization. These raised fine particles are carried along with the process gas to preceding stages of the process and hence cannot be taken out efficiently. The consequence is the formation of dust loops inside the process and decreased energy efficiency.

Document U.S. Pat. No. 5,174,799 describes the possibility of a single cyclone separator integrated into the cooler. Therefore, dust can be removed from the upstreaming fluidization gas.

However, the problem with a single cyclone separator is its relative big size. On the one hand, its geometrical size makes it rather expensive, on the other hand its separation performance decreases. The implementation of this specific single cyclone thus failed in separating fines.

Consequently, it is the task underlying the invention to provide a fluidized bed cooler/heater, which trusty prevents dust loop formation and related reduction in energy efficiency.

Said task is solved with a device according to claim 1.

As it is the basic idea underlying the current invention, not one large single cyclone but a number of multi-cyclones are integrated into the solids cooler/heater. The much smaller cyclones are capable in separating also fine dust efficiently with a small pressure loss. So, the fine particles can be taken out of the system as finally.

It is possible, that the fluidizing gas itself is the only heat transfer medium and cools or heats the solid particles. However, also additional elements can be installed such that during operation they are at least partly surrounded by the fluidizing bed formed by the small particles. Such elements could be cooling/heating plates or coils. Typically, a heat transfer medium like water is passed through.

The minimum number of parallel-connected cyclones is two, whereby a number of at least four is preferred. Even more preferred is a number between 5 and 200, preferably 20 to 1000, most preferably 30 to 70.

In one embodiment of the invention, the cooler/heater is divided into at least two different regions, which are in fluidic contact with one another. So, each region can be fluidized separately and/or solids can be withdrawn separately which enlarges the application area as it is possible to ensure different retention times in the cooler/heater. Moreover, it is possible to have different temperature steps within one device.

Alternatively or additionally, compared to the possibility of axial inlets, at least one, preferably all cyclone(s) has/have a tangential inlet. Thereby, feed particles move spirally inside the cyclone body.

Preferably, all cyclones connected in parallel feature a common outlet leg. This is preferred due to the fact that the cyclone outlets need a certain sealing mechanism to avoid that fluidization gas together with particles is sucked back into the cyclone from below. It is more practically to use only one sealing device.

Moreover, it is preferred that the outlet leg features additional nozzles for fluidizing the separated particles. So, the outlet leg is prevented from agglomeration or, as a worst case, blocking.

As already mentioned, it is essential to seal the outlet leg. A first possibility is a collecting container, which is the easiest alternative.

To avoid the problem of agglomeration, it is further possible to provide nozzles in the collecting container for fluidizing the particles. To put it in another way, the outlet leg can also discharge into a fluidized bed.

In this context, it is particularly preferred that the outlet leg opens into the fluidized bed of the fluidized bed cooler. So, the particles can be recycled into the bed and withdrawn there from transport to other process stages.

Another possibility is the use of a seal pot as said sealing device. Such a seal pot includes a downpipe via which a stream of solids is withdrawn from the furnace, a riser pipe which close to the bottom of the downpipe is branched off from the same to the top, and a conveying gas supply below the riser pipe, wherein the stream of solids withdrawn from the furnace is fluidized by the conveying gas and transported to the reactor via the riser pipe. This not only regulates the mass flow of heat transfer medium supplied to the reactor, which can be controlled via the supply of the conveying gas.

An easier sealing element is a flap. However, also a lock hopper, a check valve or combinations of these elements is also possible.

Naturally, the invention covers any combination of at least two sealing devices, too.

Further, the invention covers also a method for cooling or heating a fine-grained solid comprising the steps of fluidizing the solid with a fluidizing gas whose temperature differs from the temperature of the solid (i) and withdrawing the fluidization gas such that the fluidization gas is divided into a plurality of cyclones connected in parallel and passes through them so that particles contained in the fluidization gas can be removed (ii).

Further features, advantages and possible applications of the invention can be taken from the following description of the drawings and the exemplary embodiments. All features described and/or illustrated form the subject-matter of the invention per se or in any combination, independent of their inclusion in the claims or their back-reference.

In the drawings:

FIG. 1*a* shows a first embodiment of a device according to the invention

Figure 1B:
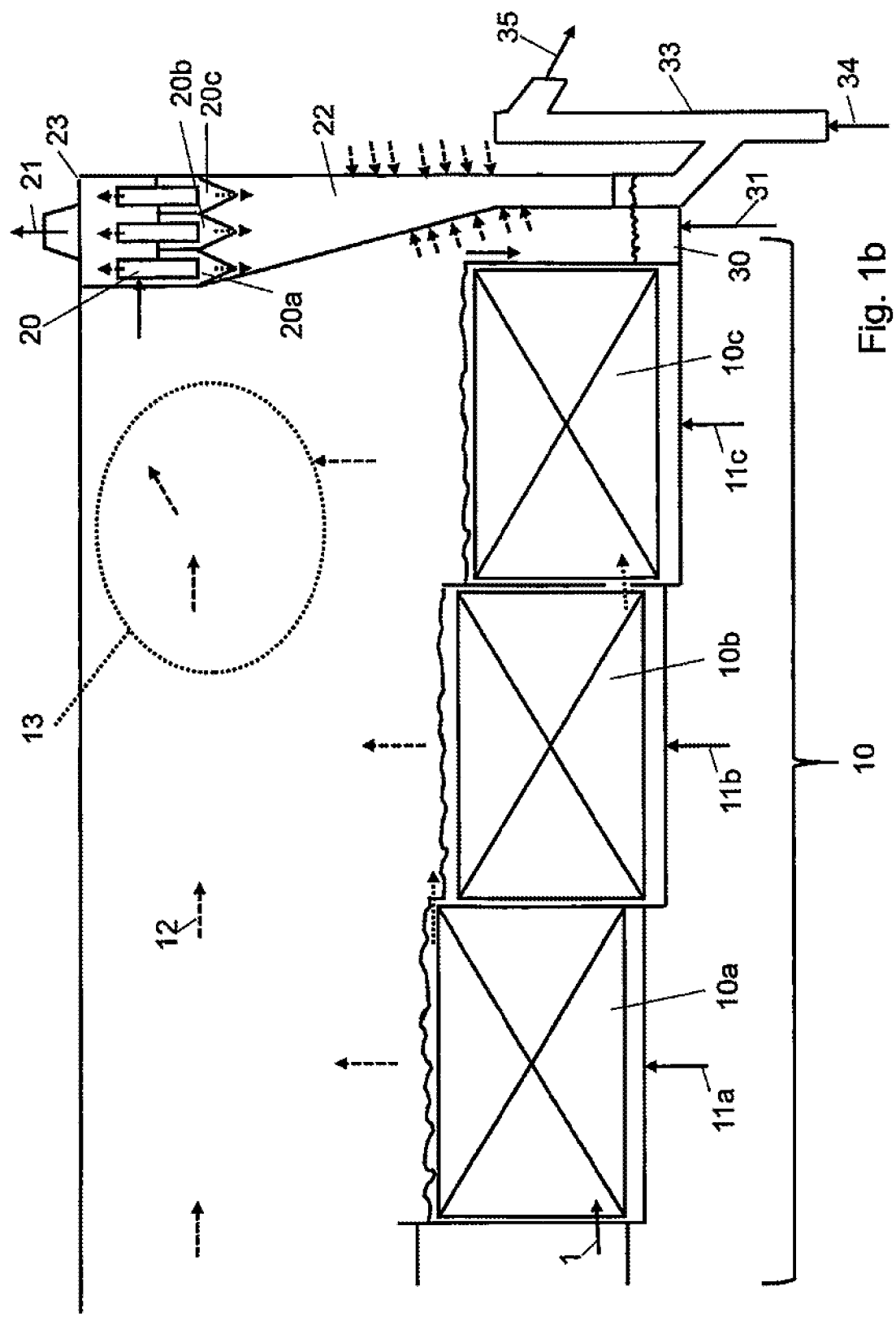

FIG. 1*b* shows a second embodiment of a device according to the invention

Figure 1C:
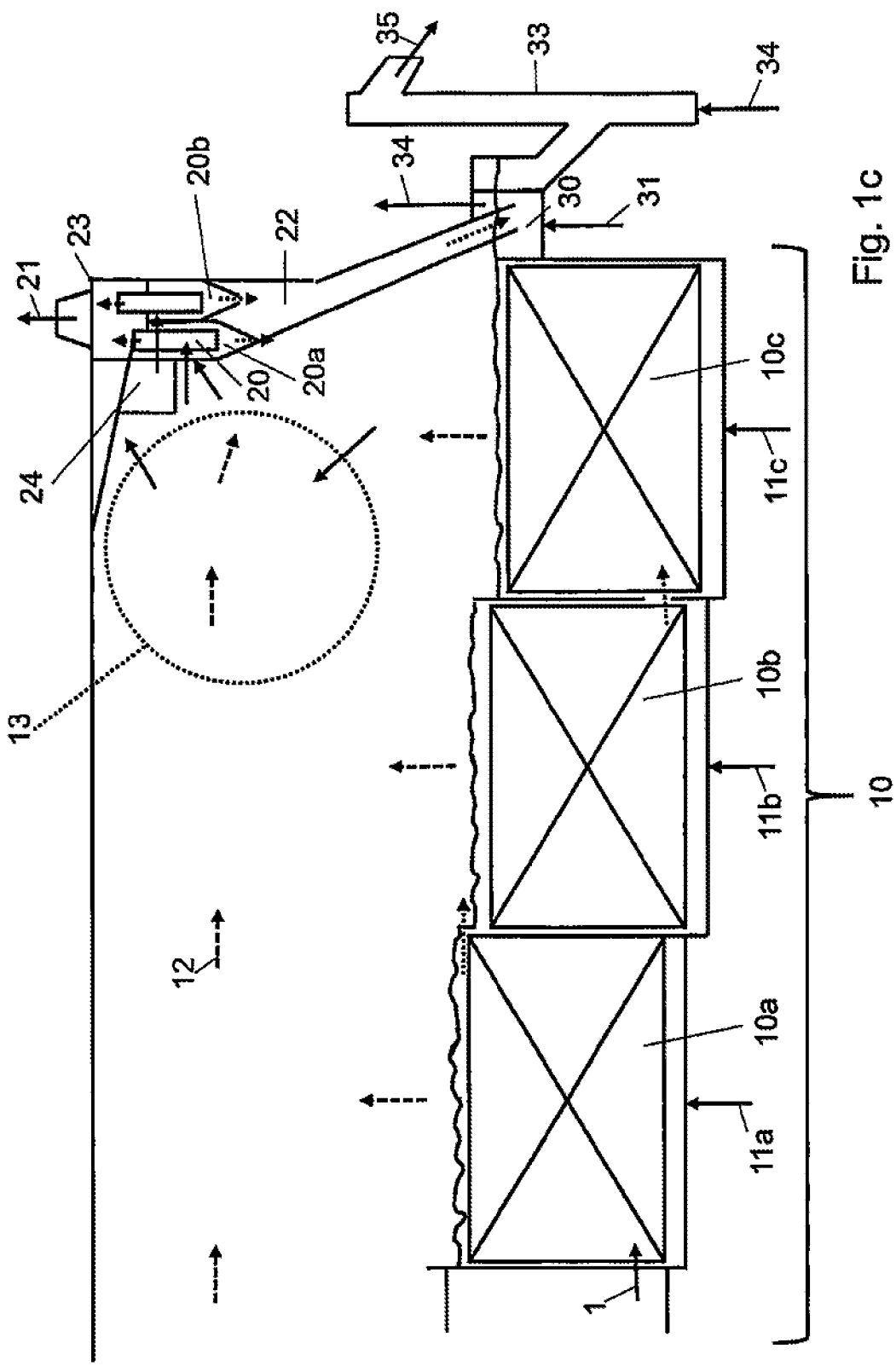

FIG. 1*c* shows a third embodiment of a device according to the invention

FIG. 2 shows an embodiment of a device according to the invention with tangential inlet.

FIG. 1a shows the sketch of an axial multi-cyclone integrated into a solids cooler/heater. The solid are fed via line 1 into a fluidized bed cooler/heater 10, which consists of the individual segments 10a, 10b and 10c. Each individual segment is supplied with fluidizing gas, e.g. air, via the schematically shown lines 11a, 11b or 11c, so that during operation a fluidized bed is formed in each segment 10a, 10b or 10c.

As sketched, these individual segments 10a, 10b and 10c are in fluidic contact with each other. The fluidizing gas escapes into a so-called free board 12, where especially above the last segment 10c entrained particles, which generally have a diameter well below the mean diameter in the fluidized beds, collect. Schematically this is marked as dust cloud 13.

This mixture of dust and gas is then fed into a multi-cyclone 20 with the individual cyclones 20a, 20b and 20c. The cleaned gas is drawn off from these via line 21, while the solid is discharged via a common outlet 22. The cyclones are preferably encased in a common housing 23.

Moreover, it has turned out to be favorable if additional fluidizing gas is introduced into outlet 22 via additional nozzles. For sealing purposes, the material is then fed into a collecting tank 30, which is also preferably supplied with fluidizing gas via line 31, which is drawn off via line 32. From there the solid passes through a so-called seal pot 33, which is supplied with fluidization air via line 34 and from which the material is then removed via line 35 and fed to not-shown downstream process stages.

FIG. 1b basically shows a similar structure, the collecting tank, whereby it is not flush with the upper edge of the fluidized bed in segment 10c as shown in FIG. a, but rather with the lower edge of segment 10c.

FIG. 1c also shows a basically identical structure, but here the multi-cyclone has a tangential insertion 24, while FIGS. 1a and 1b show an axial insertion.

FIG. 2 once again shows a section of the arrangement of the multi-cyclone and seal pot, with the outlet 22 opening directly into the seal pot 33. Although this version needs higher inlet velocities and thus larger pressure losses to separate fines efficiently compared to an axial multi-cyclone, this has sometime design advantages.

REFERENCE NUMBERS 1 line
10 fluidized bed cooler/heater
10a-c segment
11a-c line
12 freeboard
13 dust cloud
20 multi-cyclone
20a-c cyclones
21 line
22 outlet leg
23 housing
24 tangential intersection
30 container
31 line
32 line
33 seal pot
34 line
35 line

The invention claimed is:

1. A device for cooling a fine-grained solid, comprising:
a fluidized bed cooler/heater in which the solid is fluidized with a fluidizing gas and thereby releases energy in the form of heat; and
at least two cyclones connected in parallel and provided within the cooler/heater such that the at least two cyclones are located inside of the cooler/heater, whereby the cyclones are arranged such that after the fluidization of the solid the fluidizing gas passes through the at least two cyclones so contained particles are removed, wherein the at least two cyclones connected in parallel have a common outlet leg for withdrawing the particles from the fluidized bed cooler/heater and a sealing device adapted to seal the common outlet leg.

2. The device according to claim 1, wherein the fluidized bed cooler/heater is divided into at least two different segments which are in fluidic contact with one another.

3. The device according to claim 1, wherein at least one cyclone of the at least two cyclones has a tangential inlet.

4. The device according to claim 1, wherein the outlet leg includes additional nozzles for fluidizing the separated particles.

5. The device according to claim 1, wherein the outlet leg opens into a collecting container.

6. The device according to claim 1, wherein the outlet leg opens into a fluidized bed of the fluidized bed cooler/heater.

7. The device according to claim 6, wherein the outlet leg opens into the fluidized bed of the fluidized bed cooler/heater established therein during operation.

8. The device according to claim 1, wherein the outlet leg opens into a seal pot.

9. The device according to claim 1, wherein the outlet leg has a flap.

* * * * *